(12) United States Patent
Sellers et al.

(10) Patent No.: US 9,521,437 B2
(45) Date of Patent: Dec. 13, 2016

(54) INSERTION OF RECORDED SECONDARY DIGITAL VIDEO CONTENT DURING PLAYBACK OF PRIMARY DIGITAL VIDEO CONTENT

(75) Inventors: Scott D. Sellers, Quakertown, PA (US); Christopher S. del Sordo, Souderton, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 1093 days.

(21) Appl. No.: 12/486,214

(22) Filed: Jun. 17, 2009

(65) Prior Publication Data
US 2010/0325657 A1    Dec. 23, 2010

(51) Int. Cl.
| | |
|---|---|
| *H04N 21/234* | (2011.01) |
| *H04N 21/433* | (2011.01) |
| *H04N 21/44* | (2011.01) |
| *H04N 21/458* | (2011.01) |
| *H04N 21/6336* | (2011.01) |
| *H04N 21/81* | (2011.01) |
| *H04N 21/845* | (2011.01) |

(52) U.S. Cl.
CPC .... *H04N 21/23424* (2013.01); *H04N 21/4331* (2013.01); *H04N 21/44016* (2013.01); *H04N 21/458* (2013.01); *H04N 21/6336* (2013.01); *H04N 21/812* (2013.01); *H04N 21/8455* (2013.01)

(58) Field of Classification Search
USPC .............................................. 725/32, 34, 35
See application file for complete search history.

(56) References Cited

U.S. PATENT DOCUMENTS

| | | | |
|---|---|---|---|
| 6,380,991 | B1 | 4/2002 | Teichmer |
| 6,806,909 | B1 | 10/2004 | Radha et al. |

(Continued)

FOREIGN PATENT DOCUMENTS

| | | |
|---|---|---|
| CA | 2442842 | 10/2002 |
| CA | 2456100 | 2/2003 |

(Continued)

OTHER PUBLICATIONS

PCT Search Report & Written Opinion, Re: Application #PCT/US2010/036837; Sep. 6, 2010.

(Continued)

*Primary Examiner* — John Schnurr
(74) *Attorney, Agent, or Firm* — Fish & Richardson P.C.

(57) ABSTRACT

A method of operating a digital video service set top box system is provided. The set top box system accommodates playback of locally stored recorded secondary digital video content. The method begins by initiating playback of a primary digital video program. Insertion points associated with the primary digital video program are detected; these insertion points indicate frame-accurate transition points in the primary digital video program. During playback of the primary digital video program, the recorded secondary digital video program is inserted at any appropriate insertion point in a frame-accurate manner. The termination of the secondary digital video program is likewise marked and triggers a return to the primary digital video program, at the original insertion point or any other desired insertion point which may exist in the primary digital video program.

15 Claims, 8 Drawing Sheets

(56) References Cited

U.S. PATENT DOCUMENTS

| | | | |
|---|---|---|---|
| 6,993,081 B1 | 1/2006 | Brunheroto et al. | |
| 7,634,785 B2 * | 12/2009 | Smith | 725/34 |
| 7,720,432 B1 | 5/2010 | Colby et al. | |
| 2002/0122430 A1 | 9/2002 | Haberman et al. | |
| 2004/0049780 A1 | 3/2004 | Gee | |
| 2004/0221311 A1 * | 11/2004 | Dow et al. | 725/52 |
| 2005/0066357 A1 * | 3/2005 | Ryal | 725/35 |
| 2005/0081252 A1 | 4/2005 | Chefalas et al. | |
| 2006/0075449 A1 | 4/2006 | Jagadeesan | |
| 2006/0222335 A1 | 10/2006 | Russ | |
| 2007/0240602 A1 | 10/2007 | Dion et al. | |
| 2008/0155581 A1 | 6/2008 | Leary | |
| 2008/0313669 A1 * | 12/2008 | Acharya et al. | 725/34 |
| 2010/0172626 A1 * | 7/2010 | Lee et al. | 386/68 |
| 2010/0251289 A1 * | 9/2010 | Agarwal et al. | 725/34 |

FOREIGN PATENT DOCUMENTS

| | | |
|---|---|---|
| EP | 1441534 A2 | 7/2004 |
| EP | 1936970 A2 | 6/2008 |
| WO | 03/093965 A1 | 11/2003 |

OTHER PUBLICATIONS

Office Action issued in Canadian Application No. 2,764,800 on Dec. 16, 2013, 3 pages.
Office Action issued in Chinese Application No. 201080027145.0 on Dec. 18, 2013, 21 pages (with English translation).
Office Action issued in European Application No. 10730891.8 on Jan. 17, 2013, 8 pages.
International Preliminary Report on Patentability in International Application No. PCT/US2010/036837, mailed Dec. 20, 2011, 7 pages.

* cited by examiner

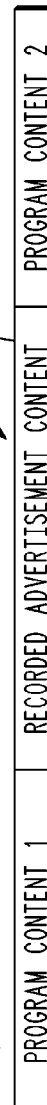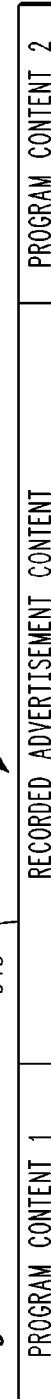
Fig. 2
Fig. 6
Fig. 7
Fig. 8
Fig. 9
Fig. 10
Fig. 11
Fig. 12

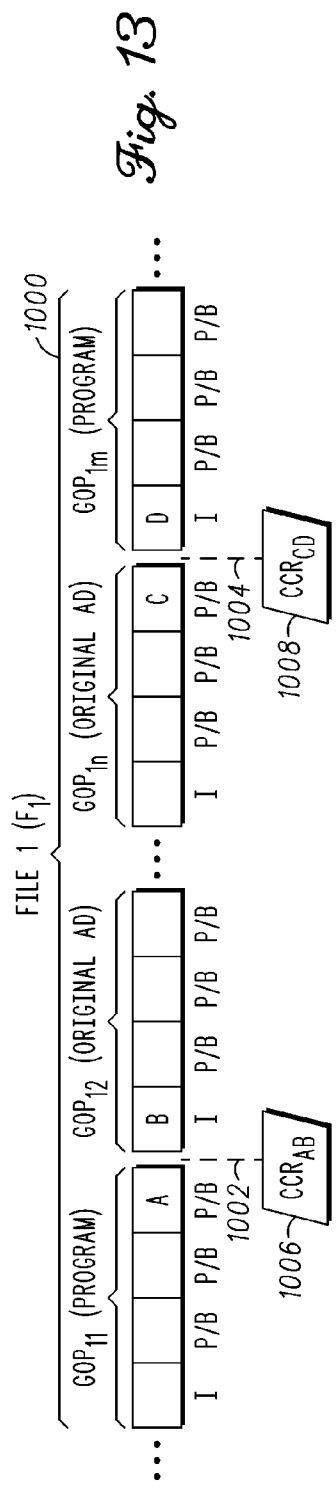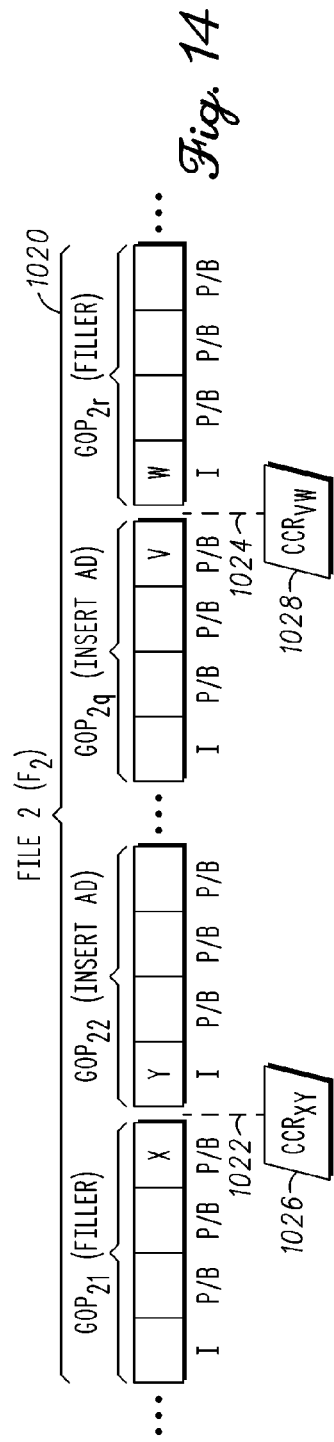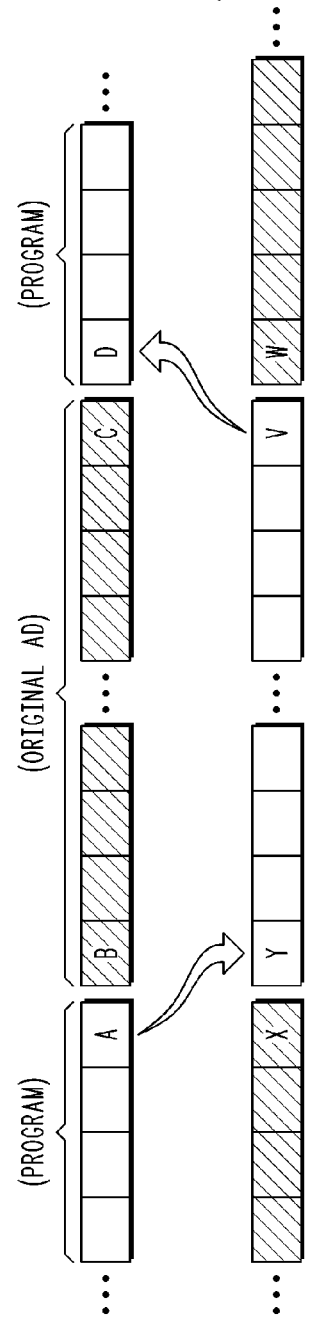

INSERTION OF RECORDED SECONDARY DIGITAL VIDEO CONTENT DURING PLAYBACK OF PRIMARY DIGITAL VIDEO CONTENT

TECHNICAL FIELD

Embodiments of the subject matter described herein relate generally to digital video systems. More particularly, the subject matter relates to the insertion of recorded video content, such as advertisements, commercials, or other programming, into a digital video program during playback.

BACKGROUND

Digital video transmission, playback, and recording systems are becoming increasingly popular and common. Digital video is utilized by cable, satellite, and traditional broadcast service providers. Digital video techniques are also employed to deliver video content to computing devices such as personal computers, cellular telephones, video game devices, and the like. Moreover, digital video recorders (DVRs) are often used to record digital video content for time-shifted playback.

Digital video programming often includes advertisements that are inserted between program segments, as is well understood. Scheduled network programming typically includes preselected advertisements that are broadcast at specified time slots. If this type of network programming is recorded by a DVR, then the recorded content will include the program segments in addition to the original advertisements that were broadcast with the program segments. Thus, the original advertisements will be presented during subsequent playback of such recorded content.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a diagram of an exemplary digital video program that is divided into a plurality of segments;

FIG. 6 is a diagram of an exemplary digital video program that includes advertisement content inserted between two program content segments;

FIG. 7 is a diagram of an exemplary digital video program that includes recorded advertisement content in place of original advertisement content, where the duration of the recorded advertisement is the same as the original advertisement content;

FIG. 8 is a diagram of an exemplary digital video program that includes recorded advertisement content in place of original advertisement content, where the duration of the recorded advertisement content is shorter than the original advertisement content;

FIG. 9 is a diagram of an exemplary digital video program that includes recorded advertisement content in place of original advertisement content, where the duration of the recorded advertisement content is longer than the original advertisement content;

FIG. 10 is a diagram of an exemplary digital video program that includes recorded advertisement content inserted before original advertisement content;

FIG. 11 is a diagram of an exemplary digital video program that includes recorded advertisement content inserted after original advertisement content;

FIG. 12 is a diagram of an exemplary digital video program that includes recorded advertisement content in place of original advertisement content, where the recorded advertisement content contains two advertisement segments;

FIG. 13 is a diagram of segments of a digital video program file;

FIG. 14 is a diagram of segments of a digital video advertisement file;

FIG. 15 is a diagram that illustrates a frame-accurate transition from the first segment of the digital video program file (depicted in FIG. 13) to the second segment of the digital video advertisement file (depicted in FIG. 14);

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 1:
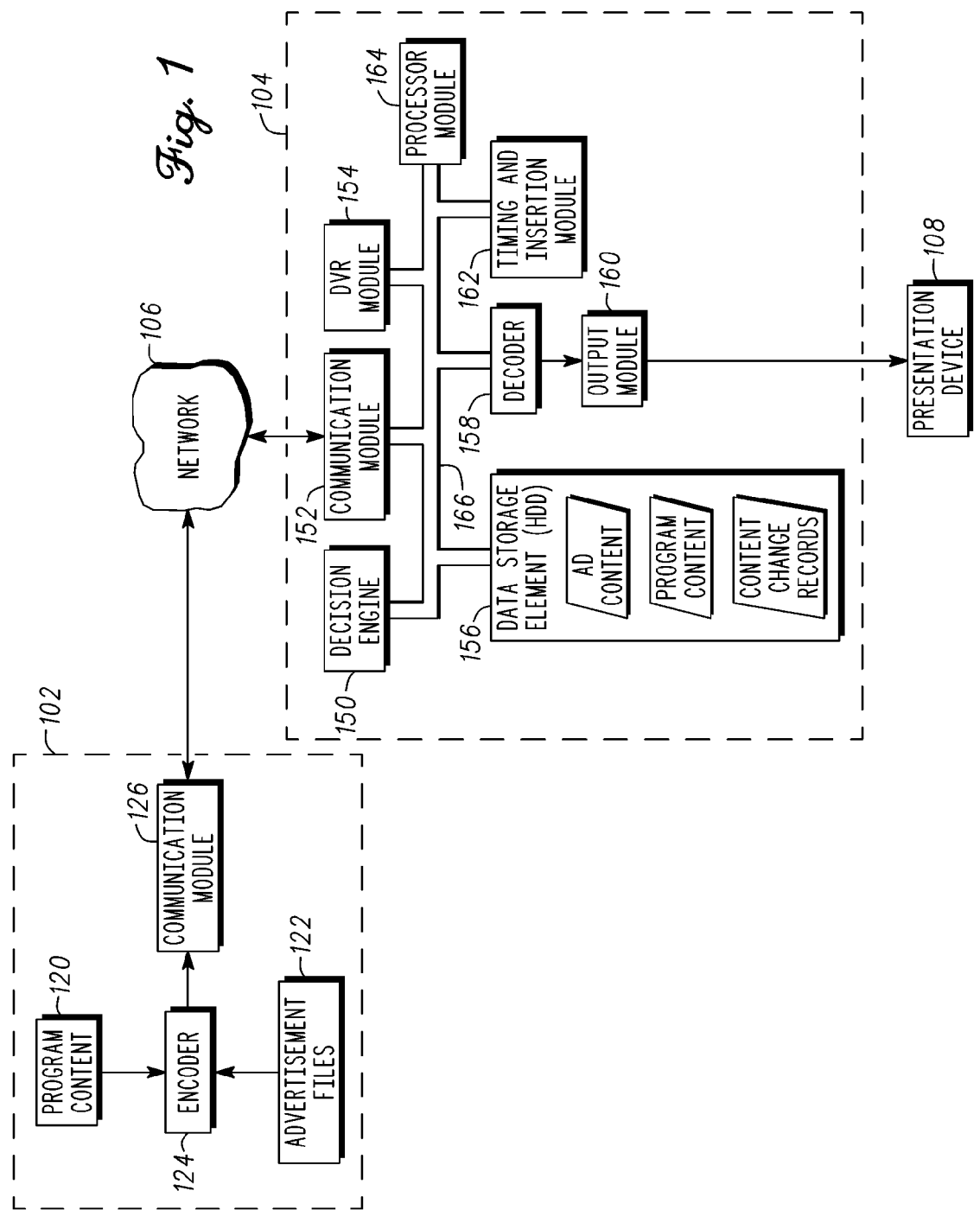
FIG. 1 is a schematic representation of an embodiment of a digital video service system.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter. Moreover, an embodiment need not always include all of the elements depicted in FIG. 1, and certain elements shown in FIG. 1 may be replaced or omitted.

The subject matter described here relates to the insertion of recorded and locally stored digital video content into a digital video program during playback of that digital video program. For ease of description, the original digital video program may be referred to herein as the "first digital video program content," the "primary digital video program," the "primary content," or the like. In contrast, the inserted digital video content may be referred to herein as the "second digital video program content," the "secondary digital video program," the "secondary digital video content," the "secondary content," or the like. The contextual meaning of the primary content and the secondary content need not be specified, defined, or otherwise classified in any particular manner. However, for ease of understanding, the following description assumes that the primary content conveys or otherwise represents the main or desired video programming content (e.g., network programming associated with a channel or service, such as a prime time show, a sporting event, a movie, or the like), and that the secondary content conveys or otherwise represents advertisement content (e.g., one or more commercials or announcements) that appears before, between, or after certain segments of the primary content.

The system described herein supports the insertion of pre-positioned targeted advertisements during the presentation of recorded or live programming material. Targeted advertising is a feature that results in a transition to an advertisement other than the default broadcast advertisement. Pre-positioned advertisements are those advertisements that are downloaded or recorded at the user's set top box system (e.g., in a hard disk or other data storage element) in advance, with the intent of being used to replace or augment advertising already present in existing (recorded) or anticipated (network delivered) entertainment program material. Although the following description addresses a methodology and procedure for using locally stored advertisements, there is no reason why the presented methodology cannot be used instead of, or in conjunction with, the insertion of network delivered targeted advertising. Indeed, both methodologies could be used together in practice.

The system described herein allows an advertiser to insert specific advertisements at any time (including during playback of previously recorded content). The ability to target a specific set top box (STB) or household with specific pre-placed advertisements is a major advantage over network-delivered targeted advertisements; this is due to the limitation of available bandwidth for use in simultaneously providing the large number of advertisements which can satisfy the divergent demographics of a particular target population.

Actors in the Process of Targeting an Advertisement

Advertisements delivered in program content streams are typically augmented with metadata and/or primary content changes (splice points or other methodologies) that allow the advertisement attributes and boundaries to be determined. Thus, each targeted advertising vendor can develop and specify its own specific requirements in relation to this metadata and stream conditioning. The targeted advertising vendor's specific stream conditioning and messaging is compatible with the targeted advertising application running on the STB, if the replacement operation is to succeed. The targeted advertising application running on the STB platform may be referred to here as the decision engine (DE). In certain embodiments, the STB platform is agnostic to the specific data requirements of the DE in determining which advertisements are replaceable. Thus, applications and/or program code used by the STB platform can provide a basic set of tools to allow the DE to perform advertisement insertions and/or replacements.

Actions performed by the STB system, and advertisement data stored by the STB system, should be DE independent—this allows the STB system to subsequently process or act on the resultant low level files (advertisements) without DE involvement. It also allows one DE vendor to be replaced by another at a later date without invalidating all currently recorded content advertisements and their associated placement positions. Because of this demarcation of responsibility, the DE informs the STB platform about actual advertisement replacement positions and desired actions. Additionally, the DE informs the STB about any potential replacement opportunities which exist, but are currently not being taken advantage of. The STB can use the information about "potential" replacement candidates at a later time to again provide an advertisement replacement opportunity on playback to the same or different DE.

In certain embodiments, recorded content that contains targeted advertisement replacements will play without error if the DE is removed from the STB platform. If the DE is removed from the STB system, any previously replaced targeted advertisements may or may not be presented; at a minimum, the default content should play without error.

Types of Program Delivery—Timing Considerations

A typical video services subscriber will view content that has been scheduled in one of two ways. The first method is the traditional network feed. This method provides a predictable and deterministic method for delivering the primary program material and the network ("default") inserted advertisements. Such a deterministic delivery mechanism like this enables network-sourced alternative advertisements (targeted advertisements) to be time synchronized and delivered at the same time, allowing replacement in "real time" as the primary program is being presented and/or recorded. However, the limited availability of bandwidth keeps the number of potential advertisement insertions at a relatively small number at any given time. As explained in more detail below, network-sourced advertisements can be augmented with a pool of previously recorded advertisements that have been locally stored on the hard disk drive (or other data storage element) of the STB system.

The second method of presenting material is from a source which allows the viewer to control or "throttle" the presentation. Such sources include but are not limited to digital video recorder (DVR) playback and video on demand (VOD) sessions. During presentation from these sources, it is not possible to use network-supplied advertisement streams. This is due to the inability to synchronize a network advertisement with the advertisement insertion point in the primary program material. In this regard, the system and methodologies described here enable the storing and reusing of targeted advertisements, so that the time varied nature of the presentation is no longer a factor in placing these advertisements.

Advertising Opportunities

In programs which are delivered to the subscriber, there are potentially different types of inserted advertisements. A first type would be those intentionally inserted without the potential of ever being replaced. These advertisement segments would contain no targeted metadata or any other timing or splice information indicated for these advertisements. These advertisements are intended to be "permanent" in nature. A second type are potential replacement advertisements. In certain circumstances, these advertisements have metadata references and/or splice points indicated in the content stream identifying them as potential replacements. During background recording mode of operation (i.e., not presented but recording) or during normal presentation modes (i.e., live broadcast or playback modes), these advertisements may be replaced, or they remain intact and, therefore, untouched.

In certain embodiments, the metadata associated with replaceable advertisements is application dependant. Accordingly, application-dependant processing determines ultimately whether or not an advertisement is replaceable. If an advertisement is replaceable but is not going to be replaced at the time of recording, the DE can inform the STB platform of such status. This indication allows the STB platform to potentially replace this advertisement in future even though it will not be replaced during recording.

Recording Advertisements for Later Insertion

In certain embodiments, the STB system can mark the boundaries of advertisement insertion candidates during recording. Once the boundaries are marked, they can be used in the future, independent of vendor-specific methodologies and/or protocols. In this regard, recorded advertisements can be inserted into a playback stream without any intervention on the part of the DE. Single recorded files can include multiple pre-positioned advertisements or a single file can include only one pre-positioned advertisement.

The DE can be responsible for determining what advertisements it would like to download, and for taking the appropriate actions to accomplish such downloading. In practice, the DE can record these advertisements during off-peak time periods, when the subscriber is not using the STB tuners. After the DE has recorded an advertisement, and taken the necessary steps to add boundary markers at the beginning and end of the recorded advertisement, the advertisement will be insertable at a later time without requiring DE intervention (though not excluding it).

Real Time Insertion—Accuracy (on-the-Spot Placement)

In certain embodiments, the DE is able to replace live or recorded advertisements with locally stored resident advertisements with a high degree of accuracy (e.g., at MPEG-2 I-frame boundaries). In practice, however, the STB system will acquire a service before its decoder is setup for presentation. Thus, simply marking an I-frame boundary does not necessarily allow playback to occur on that boundary. The STB system and techniques described here resolve this issue to enable on-the-spot transitions in a frame-accurate and seamless manner.

Real Time Insertion—Response Time (Insertion Delay Considerations)

In a traditional approach, events at the file layer are detected by the STB platform, and a notification of some kind is delivered to the DE. The DE then initiates the required action based on this event. If these events are generated at the transition points of replaceable advertisements and delivered to the DE, requiring the DE to make the file transition commands, then delay will be encountered. The delay is especially large when high speed trick modes (e.g., fast forward, fast rewind) are in effect. The STB system and techniques described here resolve this issue to enable the DE to invoke specific operations, and specific times, without the need to "time" the exact location of the content playout at any particular moment.

Live Content with Locally Stored Advertisements Inserted

In certain situations, it might be desirable to insert locally stored advertisements during live viewing of network content. The inserted content could replace or supplement the default network advertisements. When this live content is also being recorded (by, for example, a DVR), the inserted advertisement that is presented live could also become the "default" advertisement during subsequent playback of the recorded content. As mentioned previously, this replacement default advertisement can be presented during subsequent playback without any DE involvement.

Summary of Features and Operating Characteristics

Various embodiments described herein support the insertion of recorded advertisements into a digital video program during presentation and/or playback. The embodiments are suitably configured to support a number of features and operations. These features, operations, and characteristics include, without limitation:

advertisement and program boundary demarcation;

allow for different length insertions vis-à-vis the default advertisement length;

allow insertions during playback of already replaced (recorded) advertisements;

allow insertions during playback of defaulted (not replaced during recording) advertisements;

allow insertions during live presentation;

allow insertions during live presentation to be "pseudo-recorded" for repeat playback, without any involvement of the DE;

allow for on-the-spot transitions (I-frame boundaries) with acquisitions lead times reduced;

allow trick plays across certain types of recorded or insert advertisements; and allow for downloading of single and multiple advertisement files for later insertion.

Referring now to the figures, FIG. 1 is a schematic representation of an embodiment of a digital video service system 100 that supports the content insertion techniques described herein. System 100 generally includes a headend facility 102 and an STB system 104, communicatively coupled together via at least one data communication network 106. The headend facility 102 and the STB system 104 are each appropriately designed, configured, programmed, and arranged to perform and support the various operations, functions, and processes described in more detail herein. The headend facility 102 may service any number of different STB systems, which may be physically located throughout a geographic region. For the sake of brevity and simplicity, FIG. 1 only depicts one of possibly many STB systems.

The headend facility 102 serves as a centralized server of digital video services. In practice, the headend facility 102 can receive and process digital video feeds associated with any number of programming channels or services, and then deliver the programming or services to the STB system 104. In turn, the STB system 104 responds to user selections and preferences, decodes digital video content received from the headend facility 102, and presents the video content at a suitably configured presentation device 108 (which may be realized as a television, a computer monitor, a mobile computing device, a video game console, a household appliance, or the like).

The headend facility 102 is suitably configured to process digital video program content 120 and (in certain situations) digital video advertisement files 122 as needed to support the delivery of video services to the STB system 104 and to facilitate the transmission of the digital video advertisement files 122 to the STB system 104 for local storage. Although not required, the following example assumes that the digital video advertisement files 122 originate at the headend facility 102. In some situations, the STB system 104 could alternatively (or additionally) obtain one or more digital video advertisement files 122 from a source other than the headend facility 102.

The headend facility 102 includes an encoder 124 that encodes the digital video program content 120 and/or the digital video advertisement files 122 for transmission to the STB system 104 over the network 106. A communication module 126 enables the headend facility 102 to communicate with the network 106. This allows the headend facility 102 to provide digital video services to the STB system 104, and to download the digital video advertisement files 122 to the STB system 104. The communication module 126 may also be utilized to receive data (such as VOD control commands) from the STB system 104.

The headend facility 102 (in particular, the encoder 124) may be compatible with one or more digital video formats, standards, protocols, and techniques. In this regard, the headend facility 102 may support one or more of the following: MPEG-2; MPEG-4; or the like. Certain exemplary embodiments are described herein with reference to MPEG-2 techniques and nomenclature, because MPEG-2 is well-understood and commonly implemented in digital video services systems. It should be appreciated that the system 100 and the embodiments described herein could be implemented and configured to support other formats if desired, and that the embodiments are not restricted by or otherwise limited to MPEG-2.

The STB system 104 may be realized using one or more hardware devices or packages. For simplicity and ease of description, FIG. 1 depicts the STB system 104 as a single component that includes or cooperates with a number of elements, features, modules, etc. Alternatively, the STB system 104 may be implemented using a plurality of different components that cooperate with one another. The STB system 104 includes, without limitation: a decision engine (DE) 150; a communication module 152; a DVR module 154; a data storage element 156; a digital video decoder 158; an output module 160; a timing and insertion module 162; and a processor module 164. These elements may be coupled together using a suitable interconnection architecture 166 that facilitates data communication between the elements. An embodiment of the STB system 104 may include additional elements, features, and modules that are utilized to support well known or conventional functions and operations that will not be described in detail here.

The processor module 164 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. The processor module 164 may include one processor device or a plurality of cooperating processor devices.

Moreover, a functional or logical module/component of the system 100 might be partially or completely realized or implemented with the processor module 164. For example, at least a portion of the following elements could be implemented with, or be executed by, the processor module 164: the DE 150; the communication module 152; the DVR module 154; the decoder 158; the output module 160; or the timing and insertion module 162.

The data storage element 156 includes a suitable amount of memory, which may be realized as flash memory, EPROM memory, EEPROM memory, registers, a hard disk, a removable disk, a CD-ROM, or any other form of storage medium known in the art. In this regard, the data storage element 156 can be coupled to other elements of the STB system 104 to support the reading of information from, and the writing of information to, the data storage element 156. In certain embodiments, the data storage element 156 is implemented as a hard disk drive that is associated with the DVR module 154. In this regard, the data storage element 156 can be used to record digital video content while such content is being delivered by the headend facility 102, and the data storage element 156 can be used as a source to play back stored digital video content on the presentation device 108. Moreover, the data storage element 156 is suitably configured to store at least one insertion content file that includes secondary digital video content (e.g., a replacement advertisement). The headend facility can download such insertion content files to the STB system 104, or the STB system 104 could otherwise receive the insertion content files via the communication module 152. In FIG. 1, the digital video advertisement files 122 represent exemplary insertion content files. In certain situations, the data storage element 156 could also be used to store content change records (CCRs) that correspond to digital video content files and/or digital video insertion content files processed by the STB system 104. CCRs are described in more detail below.

The communication module 152 enables the STB system 104 to communicate with the network 106. This allows the STB system 104 to obtain digital video services and digital video advertisement files 122 from the headend facility 102. The communication module 126 may also be utilized to receive data (such as VOD control commands) from the STB system 104. The communication module 152 is also used to retrieve commands that help the decision engine 150 understand when to perform transitions to targeted advertisements.

The DVR module 154 may be implemented using, for example, hardware, software, firmware, or a combination thereof. The DVR module 154 is configured to record digital video files for subsequent playback and/or processing by the STB system 104. More specifically, the DVR module 154 is responsible for recording original program content files, which may or may not include original advertisement content. In certain embodiments, the DVR module 154 is also responsible for recording insertion content files that are downloaded from the headend facility 102. The DVR module 154 is also responsible for storing appropriate splice out marks (which are embedded in or otherwise conveyed with original program content files and/or insertion content files) during the recording of digital video files. In this regard, MPEG-2 splice out marks can be used to indicate, without limitation, beginning frames, ending frames, and/or transition point frames associated with digital video content. In some situations, an MPEG-2 splice out mark could be used to indicate a frame in a video stream even though that frame is not associated with a transition between content. The DVR module 154 may also play a role during playback of recorded digital video content, in a manner that is well understood.

The decoder 158 is configured to decode digital video files for playback and presentation on the presentation device 108. The decoder 158 can decode program content files (which may convey primary content or secondary content), insertion content files, and any compatibly formatted digital video file. As explained previously, the STB system 104 (in particular, the decoder 158) may be compatible with one or more digital video formats, standards, protocols, and techniques. In this regard, the STB system 104 may support one or more of the following: MPEG-2; MPEG-4; or the like. That said, the embodiment of STB system 104 is described herein with reference to MPEG-2 techniques and nomenclature, because MPEG-2 is well-understood and commonly implemented in digital video services systems.

The decoder 158 may include or cooperate with the output module 160 to facilitate presentation of decoded video content on the presentation device 108. Thus, the output module 160 may be considered to be an output interface for the STB system 104. In practice, the output module 160 may be designed for compatibility with a number of different presentation device platforms, architectures, devices, and hardware. Moreover, the output module 160 may be designed to support one or more standardized electronic display protocols or specifications. In practice, the decoder 158 may include or cooperate with a decode buffer and a secondary (compressed) buffer for the video data. The decoder 158 may be suitably configured to generate presentation time stamp (PTS) indicators at appropriate times to support various operations of the STB system 104, which are described in more detail below. In addition, the decoder 158 could generate a buffer underrun indication when the decode buffer is empty.

The DE 150 may be implemented using, for example, hardware, software, firmware, or a combination thereof. In practice, the DE 150 can be realized as a piece of software running on the STB system 104. The DE 150 is typically not part of the STB system firmware, but could be. Accordingly, its location and/or "ownership" need not be specified or implied. Its backend function is to use data obtained from analyzing demographic data or personal viewing history for purposes of customization and/or targeted advertising. This data is compared with the current available commercial (advertisements) set and a "best fit" to the current customer is obtained. In certain embodiments, the set of currently available advertisements also includes the default primary content advertisement, not just all the alternatives that can be inserted. The frontend function of the DE 150 is to get the next advertisement information and actually control the transition from the primary to the secondary content.

In certain embodiments, the DE 150 uses software and messaging from the headend facility 102 to determine when to switch to a recorded advertisement. The DE 150 is suitably configured to support the insertion of stored secondary digital video content into a digital video program, as described herein. In certain embodiments, the DE 150 detects or determines that an advertisement is approaching in a digital video stream, and decides whether or not that advertisement is to be replaced or supplemented with a locally stored advertisement. Thus, the DE 150 cooperates with other modules and elements of the STB system 104 such that the STB system 104 can perform secondary content insertion techniques at the appropriate time. In practice, therefore, the DE 150 makes its determinations with sufficient lead time to allow the STB system 104 to perform secondary content insertions in a frame-accurate and seamless manner during playback.

An embodiment of the DE 150 can respond to control messages, inband signaling messages, and/or private data streams received from the headend facility 102, where such received information conveys data that allows the DE 150 to determine whether or not to insert a locally stored advertisement into a digital video program during playback. In an exemplary implementation, the DE 150 can create, process, and/or configure insertion macros that provide specific instructions to the STB system 104. The headend facility 102 can provide insertion macros to the STB system 104, or the STB system 104 could generate insertion macros based on information provided by the headend facility 102. In certain embodiments, an insertion macro is equivalent to an API call to do a transition. However, an insertion macro is called well ahead of time so the transition command is "stored" for use later by the STB system 104 (when appropriate). In contrast to a standard API call/return transaction, multiple insertion macros may be active at any time. In this regard, an insertion macro is analogous to a playlist for advertisement insertions.

In practice, an insertion macro will provide specific insertion commands for a given digital video file. For example, an insertion macro may include the following instructions: "replace the next advertisement in the original video program with the locally stored advertisement number 25." As another example, an insertion macro may include the following instructions: "for the next three advertisements in the original video program, replace the first advertisement with the locally stored advertisement number 8, replace the second advertisement with the locally stored advertisement number 9, and insert the locally stored advertisement number 10 before the third advertisement."

It should be appreciated that an embodiment of the system 100 could incorporate the DE (or at least some of its functionality) at the headend facility 102. Thus, the DE could be realized at the STB system 104 alone, at the headend facility 102 alone, or in a distributed manner at both the STB system 104 and the headend facility 102.

The timing and insertion module 162 may be implemented using, for example, hardware, software, firmware, or a combination thereof. The timing and insertion module 162 cooperates with the DE 150 to execute the desired pattern of advertisement replacements, insertions, supplements, and the like. For example, the timing and insertion module 162 is suitably configured to detect splice out marks in primary digital video content files and in secondary digital video content files, and such detection may occur during live presentation, recording, or playback of recorded files, as necessary. As explained in more detail below, a splice out mark can be utilized as a frame-accurate indicator of: a transition point between any two segments in a primary digital video content file; a transition point between any two segments in a secondary digital video content file; the beginning or end of a segment of a primary digital video content file; the beginning or end of a segment of a secondary digital video content file; a frame within a primary or secondary digital video content stream; etc.

In certain embodiments, MPEG-2 splice marks (or other frame-accurate mechanisms which are typically supportable by hardware decoders) are detected by the STB system 104 at an appropriate time, such as during recording of digital video content files, on-the-fly during live presentation of digital video content, or after the associated digital video content file has been recorded. Information associated with detected splice out marks is then processed and saved in the form of at least one content change record (CCR)—which may be realized as a database entry, a file, a lookup table structure, or the like—that can easily be used to determine where (in the corresponding digital video file) content should start and/or stop.

In practice, a CCR can contain information about a splice out mark that does not represent a change in the content stream, or it can contain information about a change that has taken place. Moreover, a splice out mark and associated CCR can identify a transition point between leading or trailing "filler" frames that might appear before or after a segment of digital video. For example, one splice out mark and associated CCR can be used to identify the transition between leading filler frames and the first frame of video content, another splice out mark and associated CCR can be used to identify the transition between the last frame of video content and trailing filler frames, while yet another splice out mark and associated CCR might identify the transition between two segments of video content.

A CCR might contain, without limitation, the following information associated with a splice out mark: (1) the file offset value; (2) the PTS value of the previous service, i.e., the PTS value of the last frame prior to a change; (3) the PTS value of the new service, i.e., the PTS value of the next frame following the insertion point; (4) the stream time (if applicable), which is an estimate of the display time since recording began; (5) a list of service attributes for the previous service; (6) a list of service attributes for the next service; and (7) a time/date stamp that indicates the time and/or date of creation of the CCR. A list of service attributes may include, without limitation: a list of packet identifiers (PIDs) in the service; service component stream types; program map table (PMT) descriptors; and service number. If a splice out mark indicates a position or transition between two frames from the same service, then the list of service attributes for the "previous" service will be identical to the list of service attributes for the "next" service.

A file offset value represents "where" in the digital video file the respective splice out mark was detected. Accordingly, the file offset value will typically be expressed in bytes, where zero bytes corresponds to the beginning of the digital video file and the total size of the digital video file (in bytes) corresponds to the end of the digital video file. Note that the beginning and end of the digital video file need not (and typically do not) represent the beginning and end of the video content that is conveyed in the digital video file.

A PTS value represents "when" in the digital video file the respective splice out mark was detected. In this regard, the PTS value represents a time in the video content stream that is relative to some reference time, which may be maintained by the STB system 104. In practice, each frame in the digital video file can have an associated and respective PTS value, and the PTS values increment by some predetermined amount of time with the digital video content stream.

The CCRs and the information contained therein can be used to transition between primary digital video content (e.g., a movie) and locally stored secondary digital video content (e.g., a replacement advertisement). As explained in more detail below, the CCRs enable the STB system 104 to transition between primary and secondary digital video content in a frame-accurate manner while ignoring or disregarding the actual splice out marks that were used to derive the CCRs. For example, the last video frame in a leading segment of digital video content in one file (typically the last frame of a GOP) can be immediately followed by the first video frame (e.g., an I-frame) in a subsequent segment (the start of the next GOP) of digital video content in a different file, without any "blank" video frames or delay between the two segments.

In practice, a CCR can be created such that it is valid for change in content that is not necessarily frame-accurate. Moreover, other frame-accurate techniques and methodologies (other than MPEG-2 splice out marks) could be utilized to mark, generate, or populate CCRs. Furthermore, non-frame-accurate techniques and technologies could be used to mark, generate, or populate CCRs (e.g., a simple tune transition mark).

FIG. 2 is a diagram of an exemplary digital video program 200 that is divided into a plurality of segments. This particular digital video program 200 includes seven video segments, and each segment may represent primary content, secondary content, tertiary content, or the like. For example, Segment 1, Segment 4, and Segment 6 might convey primary content that corresponds to a movie, and Segment 2, Segment 3, Segment 5, and Segment 7 might convey secondary content that corresponds to four advertisements or commercials. All of these segments may be associated with the same service. Alternatively, the digital video program 200 may represent a spliced stream of content associated with a plurality of different services. For the following description, the digital video program 200 represents an "original" program as provided by a headend facility. In other words, the digital video program 200 includes the original advertisement content transmitted by the headend facility. In this regard, the digital video program 200 might represent a "live" real-time program or a recorded program that has been locally stored by an STB system.

In certain embodiments, original digital video program files include splice out marks that indicate frame-accurate transition points between adjacent segments. In FIG. 2, the arrows represent splice out marks that have been embedded or otherwise included in the digital video program 200. A splice out mark indicates the beginning of a video segment, the end of a video segment, and/or a transition between two adjacent video segments. Typically, the headend facility will mark its outgoing digital video program files with splice out marks. As explained below, the STB system can detect and process the splice out marks and, in turn, create corresponding CCRs for the digital video program file. Although the exemplary content insertion techniques described here leverage splice out marks, those marks need not actually be used for splicing per se as that term is used in the context of MPEG-2.

In practice, splice out marks are realized as bits in a packet header. They are typically used by hardware decoders when doing MPEG-2 splicing. In this context, splicing refers to the "switching" of two or more separate digital video streams (each identified by a respective packet identifier or PID) in a manner that presents the different streams as one. For instance, if a first video PID is currently being presented, a splice out mark can be used to switch the decoder from the first video PID to a second and different video PID. In effect, this is akin to switching "channels" to present different content to the user. Thus, MPEG-2 splicing assumes that the different video PIDs are accessible and flowing at the same time. As will become apparent from the following description, the content insertion techniques and methodologies do not use the splice out marks for their intended splicing purpose. Indeed, to use such splice out marks in software would require constant buffer searches and, accordingly, very large buffers that might not be available or reasonable in practice.

As explained in more detail below, the splice out marks can remain in the content, even after recording. The system described here uses the frame-accurate splice out marks and processes the information in an appropriate manner. In this regard, the splice out mark information may be "converted" or translated into the information used to populate the CCRs for the corresponding splice out marks. Thereafter, the DE and/or platform will have a list of where all the splice out marks are, and that list can be used to schedule (via insertion macros) in advance when transitions should occur, and what should happen when they do. This allows the system to use controlled file reads to start/stop content presentation. Thus, frame-accurate transitions that are intended to be interpreted in hardware can be easily interpreted in software, and in advance, for transitions within a piece of content (e.g., a recorded DVR file). Moreover, these software readable/executable transitions can be tied or otherwise linked across files, so that the transitions can occur for different files (containing different programs or content).

An embodiment of an STB system can record digital video programs, record insertable advertisement files, and insert locally stored advertisement files into the playback stream of a live or recorded digital video program. Some operations of an STB system will be described below with reference to illustrated processes. The various tasks performed in connection with an illustrated process may be performed by software, hardware, firmware, or any combination thereof. For illustrative purposes, the description of a process may refer to elements mentioned above in connection with FIG. 1. It should be appreciated that a described process may include any number of additional or alternative tasks, the tasks shown in the figures need not be performed in the illustrated order, and a given process may be incorporated into a more comprehensive procedure or process having additional functionality not described in detail herein.

Figure 3:
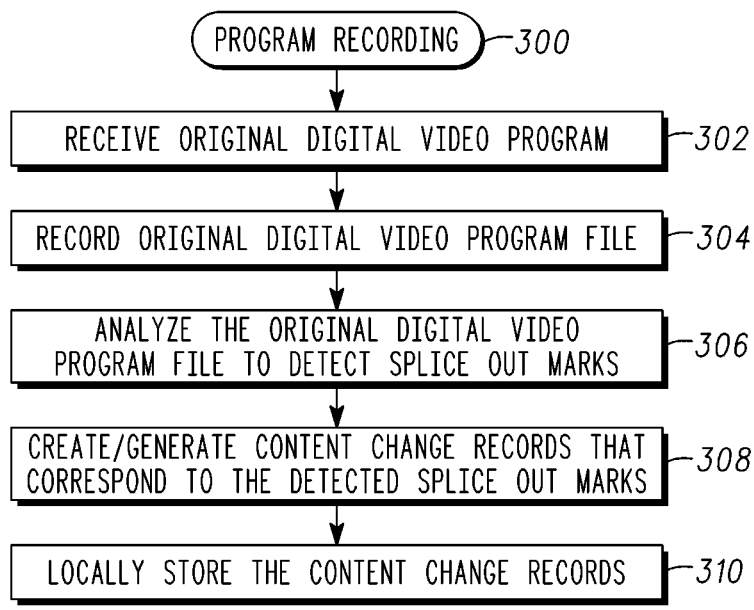
FIG. 3 is a flow chart that illustrates an embodiment of a program recording process.

FIG. 3 is a flow chart that illustrates an embodiment of a program recording process 300. The process 300 can be performed by a component such as an STB system. The process 300 begins by receiving a program content file (task 302). This description assumes that the program content file represents a primary content file that includes digital video program content, default digital video advertisement content, and splice out marks that serve as demarcation points between the video segments, as mentioned above with reference to FIG. 2. The original program content file is recorded and locally stored (task 304) to facilitate subsequent processing and/or subsequent time-shifted playback. For this particular embodiment, the originally received file, including its splice out marks, is recorded and saved as-is without modification. Although not always required, this example assumes that the stored program content file will have the original default advertisement content preserved along with the original digital video program content. Thus, the default advertisement content can be presented during playback if so desired. Task 304 results in a locally stored version of the original program content file.

In addition, the original program content file is analyzed (task 306) in an appropriate manner to detect the splice out marks contained therein. Depending upon the implementation, the analysis could occur before or while the original program content file is being read in and stored. Thus, the order of tasks 304 and 306 may be reversed or the process 300 could perform tasks 304 and 306 concurrently. The process 300 continues by generating and creating CCRs for the original program content file, where the CCRs include information or entries that correspond to the detected splice out marks (task 308). Notably, the process 300 need not consider or otherwise respond to the splice out marks for purposes of splicing per se, because the splice out marks are merely used as references to populate the CCRs, and not for their intended splicing characteristics. As mentioned previously, the CCRs will indicate the timing positions and/or video frames corresponding to the respective splice out marks. Thus, the CCRs convey information that is suitable for use during subsequent content insertion, e.g., file offset values, PTS values, stream time values, and service attributes. For this example, the CCRs indicate the transition video frames between the digital video program content and the default digital video advertisement content. In certain implementations, each CCR will indicate or otherwise be associated with a respective frame-accurate transition point between groups of pictures (GOPs), where a GOP corresponds to a frame of data. In the context of an MPEG-2 implementation, each CCR indicates a frame-accurate transition point corresponding to a respective I-frame.

The CCRs can then be locally stored at the STB system (task 310). The CCRs are stored separately and distinct from the original digital video file from which they were derived. Again, for this particular example each CCR includes a file offset value, PTS values, a stream time value, and two sets of service attributes for a splice out mark.

Figure 4:
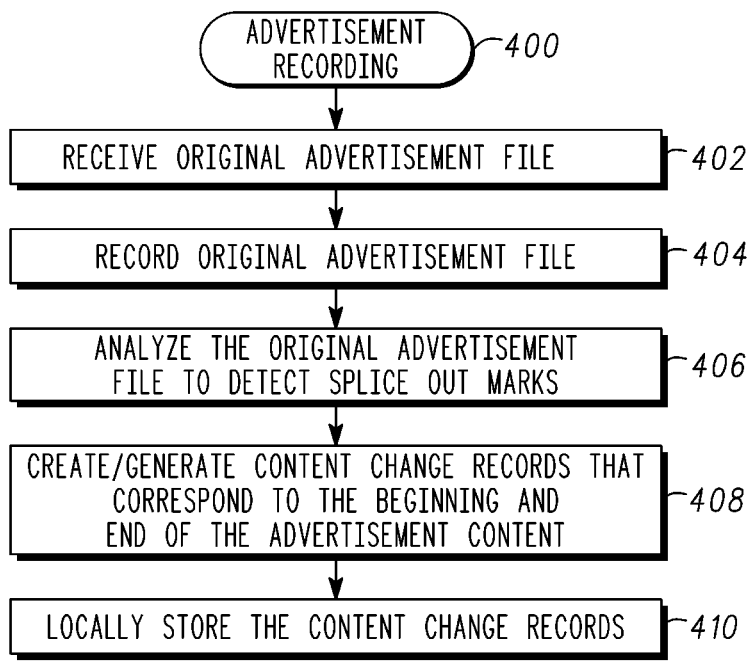
FIG. 4 is a flow chart that illustrates an embodiment of an advertisement recording process.

FIG. 4 is a flow chart that illustrates an embodiment of an advertisement recording process 400. The process 400 can be performed by a component such as an STB system. The process 400 can be performed in response to a file downloaded from the headend facility, in response to a direct (wired or wireless) file transfer from another device or component that communicates with the STB system, or in response to the coupling of suitably formatted data storage media (e.g., a flash drive or a CD-ROM) to the STB system. For example, the process 400 may be executed as a background routine during a period of time when the STB system is idle, such as overnight or whenever the STB system is not being used for playback or recording.

The process 400 begins by receiving an insertion content file, e.g., a file that includes digital video advertisement content (task 402). This description assumes that the insertion content file includes advertisement content and splice out marks that indicate the beginning and end of the advertisement content. In practice, the insertion content file may contain some leading data (that arrives before the beginning of the advertisement content) and/or some trailing data (that arrives after the end of the advertisement content). The STB system might use this appended data to prepare or otherwise condition itself for recording of the insertion content file (task 404). The insertion content file is recorded to facilitate subsequent processing and/or subsequent time-shifted playback at the time of insertion. For this particular embodiment, the originally received insertion content file, including its splice out marks, is recorded and stored as-is without modification. Task 404 results in a locally stored version of the original insertion content file.

The original insertion content file is analyzed (task 406) in an appropriate manner to detect beginning and ending splice out marks contained therein. Depending upon the implementation, the analysis could occur before or while the original insertion content file is being read in and stored. Thus, the order of tasks 404 and 406 may be reversed or the process 400 could perform tasks 404 and 406 concurrently. The process 400 continues by generating and creating CCRs for the original insertion content file, where the CCRs include information that corresponds to the detected splice out marks (task 408). The CCRs will indicate the timing positions and/or video frames corresponding to the respective splice out marks in the original insertion content file. Accordingly, one CCR will indicate the beginning video frame of the digital video advertisement content, and another CCR will indicate the ending video frame of the digital video advertisement content. In certain implementations, each CCR indicates a respective frame-accurate transition point between groups of pictures (GOPs). In the context of an MPEG-2 implementation, each CCR indicates a frame-accurate transition point corresponding to a respective I-frame.

The insertion CCRs can then be locally stored at the STB system (task 410). These CCRs are stored as separate and distinct files from the original insertion content file from which they were derived. In this regard, each insertion CCR can be conceptualized as a list of data corresponding to a respective splice out point contained in the original insertion content file. In practice, an insertion content file having only one advertisement will result in two CCRs (for the beginning and end frames), where each contains a file offset value, a PTS value, a stream time value, and service attributes. For an insertion content file that includes two or more advertisements, however, more than two CCRs will be generated.

Figure 5:
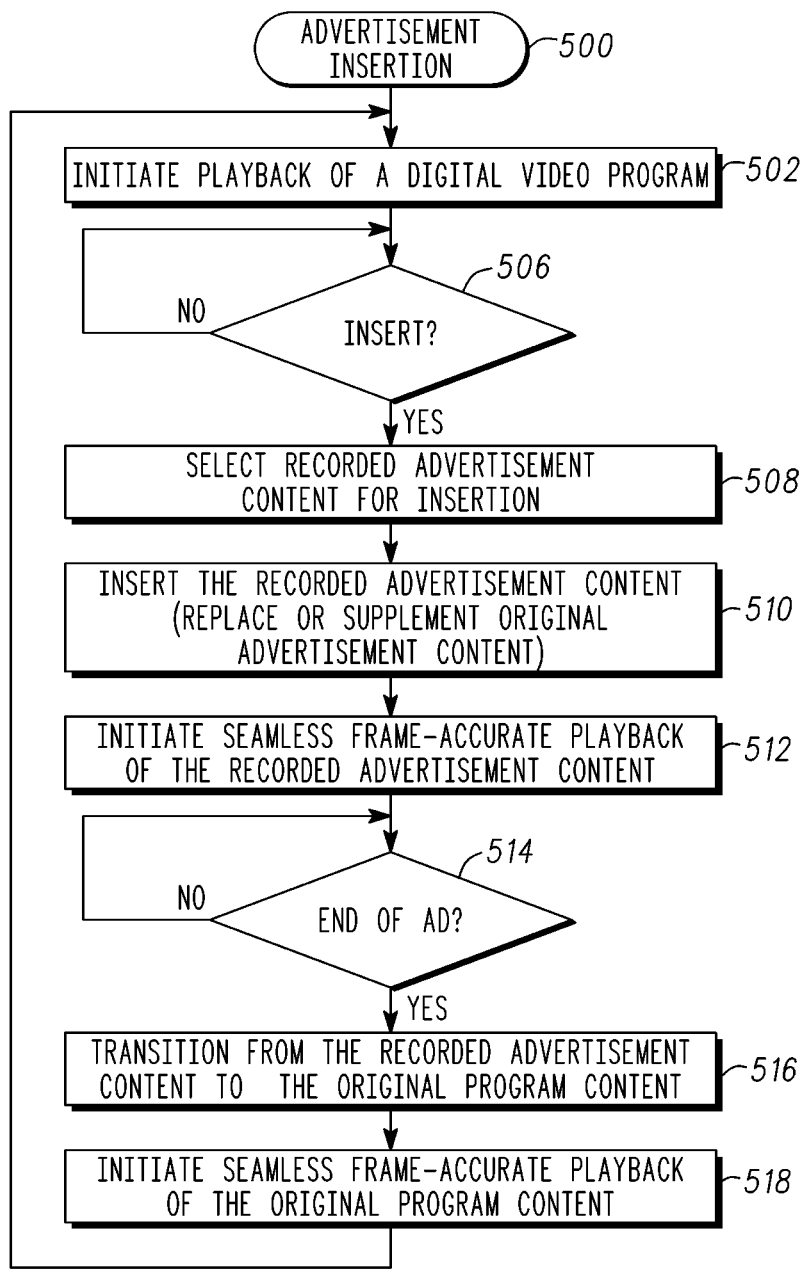
FIG. 5 is a flow chart that illustrates an embodiment of an advertisement insertion process.

FIG. 5 is a flow chart that illustrates an embodiment of an advertisement insertion process 500. The process 500 can be performed by a component such as an STB system. The process 500 is executed during playback of a digital video file; the playback may correspond to the presentation of a locally recorded video program or the live presentation of a video program concurrently (or substantially concurrently) with its transmission by the headend facility. The following description relates to an embodiment where at least one locally stored advertisement is inserted into a recorded and locally stored digital video program. The process 500 assumes that the STB system has one or more locally stored CCRs associated with certain points in the digital video program and/or the advertisement content. It should be appreciated that in practice the STB system could transition between any number of different digital video content files in the manner generally described herein. For simplicity, the process 500 refers to a basic scenario where one secondary digital video file is used as an insertion source for one primary digital video file.

The process 500 may begin by initiating playback (task 502) of a digital video file that conveys video program content. For this particular embodiment, the digital video file is a stored file that has locally stored CCRs associated with its splice out marks. During playback, the associated video content is presented on one or more presentation devices coupled to the STB system.

The process 500 determines whether or not to insert locally stored recorded advertisement content into the video program content at particular location (query task 506). Query task 506 allows the STB system to take action and insert advertisement content as desired. As mentioned above, the decision made at query task 506 might be governed by an insertion macro or other control instructions executed by the STB system.

If the process 500 determines that recorded advertisement content will be inserted (query task 506), then the STB system can select and access one or more recorded advertisements for insertion into the video program content (task 508). In practice, the STB system selects the recorded advertisement content from a library of locally stored recorded digital video files. These locally stored secondary digital video files will usually be different than, and distinct from, the primary digital video file. As mentioned above, the selection criteria may be defined by an appropriate insertion macro and/or by commands resident at the STB system. The process 500 then proceeds by inserting the selected recorded advertisement content during playback of the digital video program (task 510). The selected recorded advertisement content is inserted at a specific frame location in the manner described in more detail below. For example, the recorded advertisement content might be inserted at a particular frame position such that the presentation seamlessly transitions from a leading segment of digital video content to the recorded advertisement content. In practice, the STB system synchronizes and aligns the first frame of the recorded advertisement content with intended insertion point. In other words, presentation of the recorded advertisement content starts at its beginning video frame. Thus, the transition is frame-accurate because the first video frame of the recorded advertisement content is presented immediately following the last video frame of the first segment of digital video content. Accordingly, upon insertion of the recorded advertisement content, the process 500 seamlessly initiates playback of the recorded advertisement content from the corresponding locally stored and marked insertion content file (task 512). FIGS. 16-19 are flow charts that illustrate some exemplary processes for carrying out seamless and frame-accurate transitions; these processes could be performed in association with task 512.

The seamless and frame-accurate approach described here is a departure from a "tuning" technique that relies upon the STB system hardware to "switch channels" (using different video PIDs) for purposes of presenting different content streams in a back-to-back manner. Such tuning techniques present the video program content on one tunable channel, and present the secondary content (e.g., advertisement content) on a different tunable channel. To present the secondary content, the STB system hardware tunes away from the video program channel and tunes to the secondary content channel. After the secondary content has been presented, the STB system hardware tunes away from the secondary content channel and back to the video program channel. This tuning technique places a premium on channel switching timing and synchronization, and can result in blank video frames and other visible artifacts associated with its non-seamless nature.

The process 500 can identify the end of the recorded advertisement content (query task 514) during playback of the digital video program. In practice, the STB system could detect or otherwise determine the last frame of the recorded advertisement content. In response to the detection of the end of the recorded advertisement content, the STB system transitions from the recorded advertisement content back to the primary digital video content (task 516). The STB system can then resume playback of the primary digital video content in a seamless and frame-accurate manner (task 518). In this regard, playback of the primary digital video content resumes at a frame or position corresponding to the beginning of the desired segment. FIGS. 16-19 are flow charts that illustrate some exemplary processes for carrying out seamless and frame-accurate transitions; these processes could be performed in association with task 518.

FIG. 6 is a diagram of an exemplary digital video program 600 that includes original advertisement content that appears between two program content segments. For purposes of this example, the digital video program 600 represents the digital video program that is being played back. Thus, during live playback or during recorded playback, the digital video program 600 will present the first segment of digital video content, then the original advertisement content, and then the second segment of digital video content. The end of the first segment of digital video content, the beginning of the original advertisement content, and/or the associated transition point is identified by a first transition point 602. Similarly, the end of the original advertisement content, the beginning of the second segment of digital video content, and/or the associated transition point is identified by a second transition point 604.

FIG. 7 is a diagram of the digital video program 600' after insertion of recorded advertisement content 606 in place of the original advertisement content. For this example, the duration of the recorded advertisement content 606 is the same as the original advertisement content (within practical tolerances). Accordingly, the recorded advertisement content 606 could be inserted during live presentation of the digital video program 600' as a direct replacement of the original advertisement segment, and the viewer would perceive no delay, blackout, or other visible artifacts. In practice, the STB system could maintain video/audio mute until the decoder indicates lock on the next service (each file is assumed to have a different service in it). One method of making a file-to-file or live-to-file transition which might contain artifacts is to maintain mute or have black fade-out and fade-in sections on the primary and secondary content, respectively.

FIG. 8 is a diagram of the digital video program 600" after insertion of recorded advertisement content 608 in place of the original advertisement content. For this example, the duration of the recorded advertisement content 608 is shorter than the original advertisement content. FIG. 9 is a diagram of the digital video program 600''' after insertion of recorded advertisement content 610 in place of the original advertisement content. For this example, the duration of the recorded advertisement content 610 is longer than the original advertisement content. These two examples illustrate how the STB system can lengthen or shorten the overall duration of the recorded digital video content as desired to accommodate locally stored advertisements of any duration (for situations where the duration of the recorded advertisement is different than the duration of the default advertisement content).

FIGS. 7-9 depict situations where the original default advertisement content has been replaced with recorded advertisement content. Depending upon the situation, however, the original default advertisement content need not be replaced. In this regard, FIG. 10 is a diagram of an exemplary digital video program 700 that includes recorded advertisement content 702 inserted before original advertisement content 704. For this example, the first segment of video program content 706 ends and the recorded advertisement content 702 begins in a frame-accurate manner. After the recorded advertisement content 702 ends, playback of the original advertisement content 704 resumes in a frame-accurate manner. After the original advertisement content 704 ends, playback of the second segment of video program content 708 begins in a frame-accurate manner.

FIG. 11 is a diagram of an exemplary digital video program 800 that includes recorded advertisement content 802 inserted after original advertisement content 804. For this example, the first segment of video program content 806 ends and the original advertisement content 804 begins in a frame-accurate manner. After the original advertisement content 804 ends, playback of the recorded advertisement content 802 begins in a frame-accurate manner. After the recorded advertisement content 802 ends, playback of the second segment of video program content 808 begins in a frame-accurate manner.

FIGS. 7-11 depict situations where one segment of recorded advertisement content has been inserted into the digital video program. Depending upon the situation, however, more than one locally stored advertisement can be inserted into a digital video program. In this regard, FIG. 12 is a diagram of an exemplary digital video program 900 that includes recorded advertisement content in place of original advertisement content, where the recorded advertisement content contains two advertisement segments. For this example, the first segment of video program content 902 ends and the first recorded advertisement content 904 begins in a frame-accurate manner. After the first recorded advertisement content 904 ends, playback of the second recorded advertisement content 906 begins in a frame-accurate manner. After the second recorded advertisement content 908 ends, playback of the video program content resumes in a frame-accurate manner. As shown in FIG. 12, playback of the video program content resumes with the second segment of video program content 908.

The examples described herein are not intended to be exhaustive or otherwise limiting of the described embodiments. Indeed, an embodiment of the STB system may be suitably configured and controlled to insert, arrange, and present any number of locally stored advertisements in connection with the playback of a digital video program. Moreover, an embodiment of the STB system may replace any number of default advertisements included in the original digital video program (including all or none of them). The STB system is very flexible in this regard.

The techniques and methodologies presented above will be further described with reference to several examples that refer to an MPEG-2 implementation. In this regard, FIG. 13 is a diagram of four segments of a digital video program file 1000 (labeled $F_1$). For this example, the digital video program file 1000 includes a group of pictures (labeled $GOP_{11}$) associated with regular program content, groups of pictures (identified by the labels $GOP_{12}$ and $GOP_{1n}$) associated with default, original, or network-provided advertisement content, and a group of pictures (labeled $GOP_{1m}$) associated with regular program content. FIG. 13 depicts how the first video frame in each GOP is an I-frame, while the remaining video frames in each GOP are either P-frames or B-frames, as is well understood. For purposes of this description, the last video frame in $GOP_{11}$ is labeled "A", the first video frame in $GOP_{12}$ is labeled "B", the last video frame in $GOP_{1n}$ is labeled "C", and the first video frame in $GOP_{1m}$ is labeled "D". In reality, a GOP may include any number of frames, and the digital video program file 1000 may include any number of GOPs.

FIG. 13 also depicts a first splice out mark 1002 and a second splice out mark 1004. The first splice out mark 1002 corresponds to and indicates the transition from $GOP_{11}$ to $GOP_{12}$, and the second splice out mark 1004 corresponds to and indicates the transition from $GOP_{1n}$ to $GOP_{1m}$. FIG. 13 also depicts the two CCRs associated with the splice out marks 1002 and 1004. In this regard, a first CCR 1006 (labeled $CCR_{AB}$ because it refers to the transition between video frame A and video frame B) corresponds to the splice out mark 1002, and a second CCR 1008 (labeled $CCR_{CD}$ because it refers to the transition between video frame C and video frame D) corresponds to the splice out mark 1004.

FIG. 14 is a diagram of three segments of a digital video advertisement file 1020 (labeled $F_2$). For this example, the digital video advertisement file 1020 includes a group of pictures (labeled $GOP_{21}$) that may be considered to be filler data, groups of pictures (identified by the labels $GOP_{22}$ and $GOP_{2q}$) associated with replacement or insert advertisement content, and a group of pictures (labeled $GOP_{2r}$) that may be considered to be filler data. In this context, the filler data represents "dummy" frames or other information that is not actually used or needed to present the insert advertisement content. FIG. 14 depicts how the first video frame in each GOP is an I-frame, while the remaining video frames in each GOP are either P-frames or B-frames. For purposes of this description, the last video frame in $GOP_{21}$ is labeled "X", the first video frame in $GOP_{22}$ is labeled "Y", the last video frame in $GOP_{2q}$ is labeled "V", and the first video frame in $GOP_{2r}$ is labeled "W". As mentioned above with reference to FIG. 13, a GOP may include any number of frames, and the digital video advertisement file 1020 may include any number of GOPs. Moreover, a single digital video file may include content for any number of different advertisements, corresponding to any number of different services, and identified by any number of different video PIDs.

FIG. 14 also depicts a splice out mark 1022 that corresponds to and indicates the transition from $GOP_{21}$ to $GOP_{22}$, and a second splice out mark 1024 that corresponds to and indicates the transition from $GOP_{2q}$ to $GOP_{2r}$. FIG. 14 also depicts the two CCRs associated with the splice out marks 1022 and 1024. A CCR 1026 (labeled $CCR_{XY}$ because it refers to the transition between video frame X and video frame Y) corresponds to the splice out mark 1022, and a CCR 1028 (labeled $CCR_{VW}$ because it refers to the transition between video frame V and video frame W) corresponds to the splice out mark 1024. In other words, the CCR 1026 ($CCR_{XY}$) can serve as an indicator of the beginning video frame of the digital video advertisement content, and the CCR 1028 ($CCR_{VW}$) can serve as an indicator of the ending video frame of the digital video advertisement content.

The following description assumes that the digital video advertisement file 1020, along with its two CCRs 1026 and 1028, have been locally stored at the STB system. This local storage allows the digital video advertisement content to be inserted into the playback stream of a video file, such as the digital video program file 1000. In this regard, FIG. 15 is a diagram that illustrates a frame-accurate transition from a segment (i.e., $GOP_{11}$) of the digital video program file to a segment (i.e., $GOP_{22}$) of the digital video advertisement file. FIG. 15 also depicts a frame-accurate return from $GOP_{2q}$ back to a segment (i.e., $GOP_{1m}$) of the digital video program file. For this example, one seamless transition occurs from the video frame A (in the $F_1$ file) to the video frame Y (in the $F_2$ file), and then another seamless transition occurs from the video frame V (in the $F_2$ file) to the video frame D (in the $F_1$ file).

The shaded segments in FIG. 15 represent video frames that are ignored, not decoded, and/or not displayed. Thus, the replacement advertisement content associated with $GOP_{22}$ through $GOP_{2q}$ is inserted into the playback stream in lieu of the original default advertisement associated with $GOP_{12}$ through $GOP_{1n}$. After the last frame of the replacement advertisement content is processed, the STB system switches back to the original file $F_1$ such that the program content corresponding to $GOP_{1m}$ can be processed.

FIGS. 16-19 are flow charts that illustrate how MPEG-2 video files can be processed to support the insertion of secondary digital video content (e.g., advertisements) into recorded or live primary digital video content. For ease of description, FIGS. 16-19 will be described with reference to FIGS. 13-15, while using the same nomenclature as FIGS. 13-15. These examples are not intended to be exhaustive or limiting of the scope of the described subject matter. Rather, these examples demonstrate some of the basic concepts and protocols for transitioning from one digital video file to another.

Figure 16:
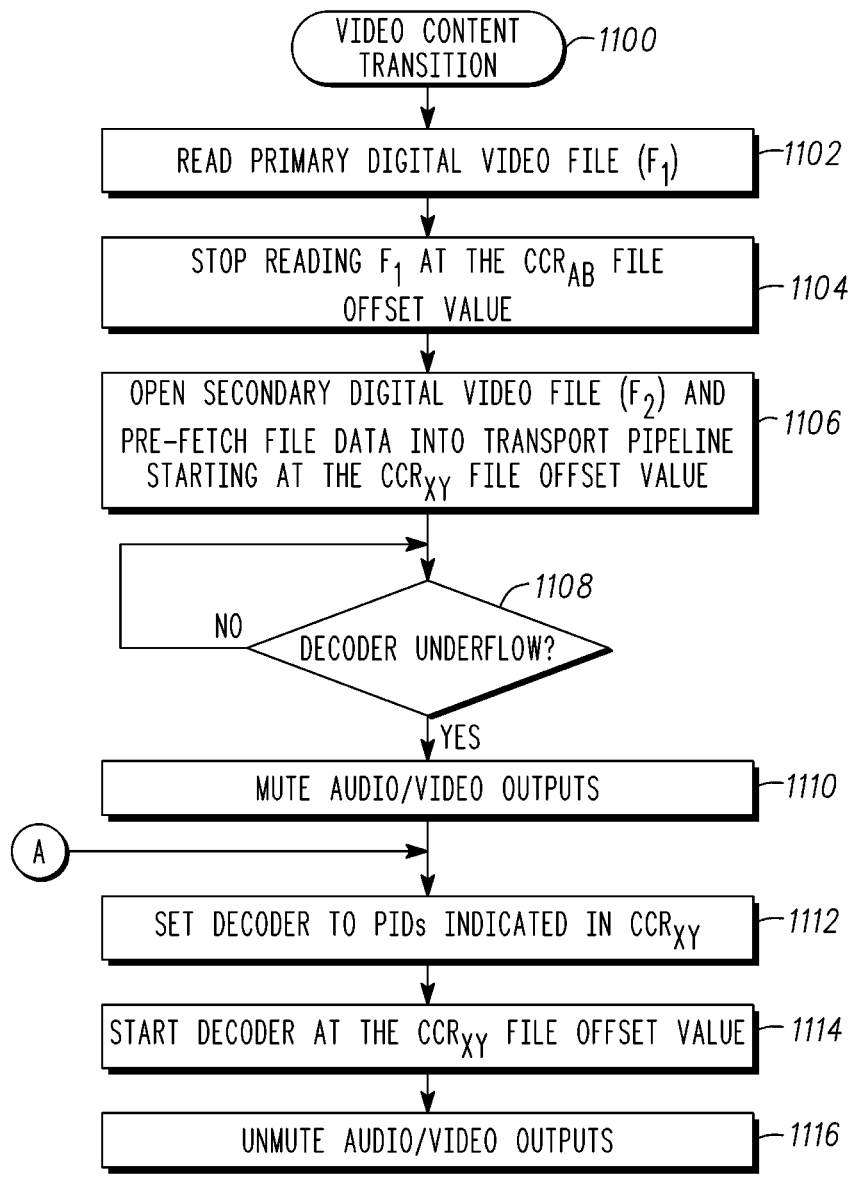
FIG. 16 is a flow chart that illustrates an embodiment of a video content transition process.

FIG. 16 is a flow chart that illustrates an embodiment of a video content transition process 1100. The process 1100 can be performed by a component such as an STB system. The process 1100 is executed during playback of a primary digital video file that has been recorded and stored locally, along with appropriate CCRs corresponding to splice out marks contained in the primary digital video file. The process 1100 begins by reading the primary digital video file ($F_1$) from the local storage media (task 1102), typically a hard disk drive (HDD). After being read from the HDD, the data for the primary digital video file can be placed into the transport pipeline (e.g., a compressed buffer or a decode buffer) to prepare for decoding.

This example assumes that the STB system has prior knowledge that some secondary digital video content (e.g., a replacement advertisement) is to be inserted into the playback stream at a designated point in the primary digital video file, e.g., the point corresponding to the splice out mark 1002 (see FIG. 13). Accordingly, the process 1100 monitors the ongoing file offset values of the primary digital video file ($F_1$) and instructs the HDD device driver to stop reading the file $F_1$ when the current file offset value satisfies certain predetermined trigger criteria (task 1104). For example, the HDD device driver may be instructed to stop reading the file $F_1$ when the current file offset value of the primary digital video file is equal to a value that corresponds to the desired transition video frame of the primary digital video file. For certain embodiments, this specific file offset value will be indicated in the appropriate CCR, e.g., $CCR_{AB}$. As mentioned previously with reference to FIG. 13, the CCR 1006 will include the file offset value of the splice out mark 1002, and the STB system can therefore provide this file offset value to the HDD device driver in advance. In practice, task 1104 is performed well in advance, for example, 5-30 seconds before the actual transition is to be displayed to the viewer. The actual time can vary depending upon the number and size of the buffers used for the primary digital video file ($F_1$). Consequently, the STB system will continue processing some buffered portion of the primary digital video file ($F_1$) even after task 1104 causes the HDD device driver to stop reading.

At an appropriate time, the process 1100 will also access and open the secondary digital video file ($F_2$) and pre-fetch some of the data into the transport pipeline (task 1106). Notably, the file offset value indicated in the appropriate CCR of the secondary digital video file is utilized as the starting point for the pre-fetching of this data. Referring to FIG. 14, the CCR 1026 will include the file offset value of the splice out mark 1022, and the STB system can use this file offset value as a reference point to determine the beginning video frame of the replacement advertisement content. In practice, task 1106 is performed before the actual transition is to be displayed to the viewer. Indeed, task 1106 may be performed concurrently or in parallel with task 1104. Thus, at least some of the desired replacement advertisement content can be pre-fetched and buffered for a quick transition when needed.

As mentioned above, some data from the primary digital video file ($F_1$) will be processed from the decode buffer even after the HDD device driver has stopped reading that file. In this particular embodiment, the decode buffer for the primary digital video file ($F_1$) is allowed to empty naturally as the decoder consumes the data before the process 1100 switches to decode the secondary digital video file ($F_2$).

Accordingly, if the process 1100 detects a decoder underflow condition (query task 1108) as a result of such data consumption, then it will proceed and mute the audio/video outputs (task 1110). As used here, a decoder underflow condition means that the decode buffer for the primary digital video file ($F_1$) is empty or otherwise contains no remaining video frame data for the primary digital video content. Thus, a decoder underflow condition means that: (1) no more data is available to the decoder; and (2) the decoder has displayed the last frame of available picture data. In certain embodiments, the underflow condition may be triggered by both audio and video data, or it may be triggered by video data only. For the example depicted in FIG. 13 and FIG. 15, the decoder underflow condition will be asserted after the video frame A has left the decode buffer (i.e., it has been decoded).

Task 1110 mutes the audio/video outputs to avoid unwanted artifacts in the presentation to the user. The process 1100 also sets the decoder to the video PIDs that are indicated in the CCR 1026 (task 1112). As explained above, the CCR 1026 ($CCR_{XY}$) contains the video PIDs associated with the replacement advertisement content. This information is needed because the video PIDs for the replacement advertisement content will be different than the video PIDs for the primary digital video content.

The STB system starts the decoder at the file offset value that is indicated in the CCR 1026 ($CCR_{XY}$). Referring to FIG. 14, the file offset value of the splice out mark 1022 indicates the beginning frame of the replacement advertisement content. This enables the STB system to resume decoding in a frame-accurate manner, precisely at the beginning of the replacement advertisement content. In connection with the decoding of the secondary digital video content file ($F_2$), the process 1100 can unmute the audio/video outputs (task 1116) so that the replacement advertisement content can be presented to the user. Referring again to FIG. 15, a similar routine can be performed to execute the frame-accurate transition from the last video frame of the replacement advertisement content (video frame V) to the first video frame in the third segment of the primary digital video file (video frame D).

Figure 17:
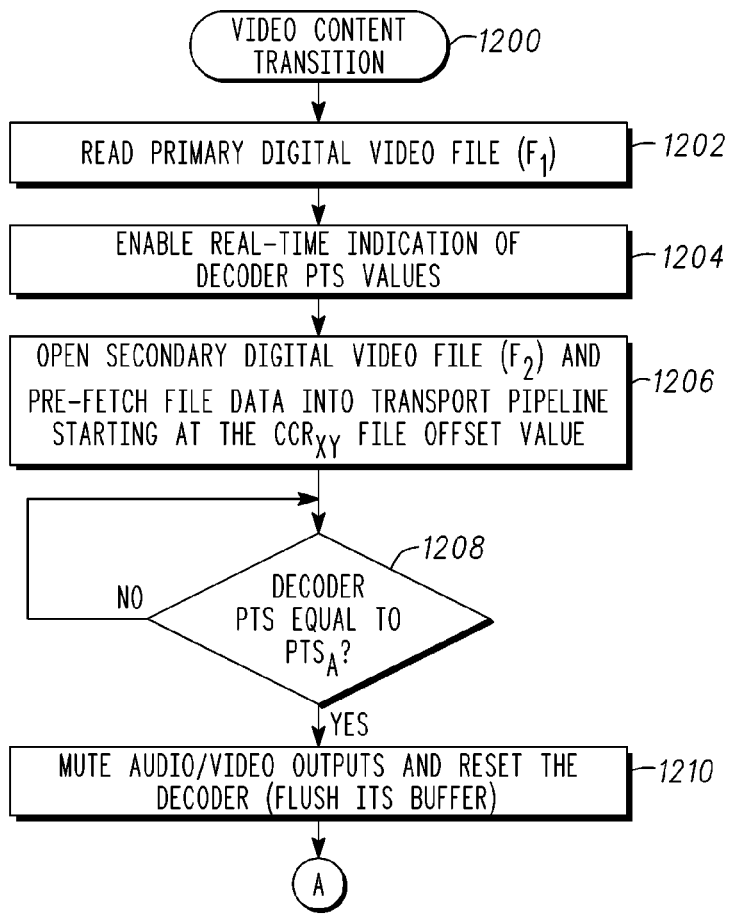
FIG. 17 is a flow chart that illustrates another embodiment of a video content transition process.

FIG. 17 is a flow chart that illustrates another embodiment of a video content transition process 1200. The process 1200 can be performed by a component such as an STB system. The process 1200 is executed during playback of a primary digital video file that has been recorded and stored locally, along with appropriate CCRs corresponding to splice out marks contained in the primary digital video file. The process 1200 begins by reading the primary digital video file ($F_1$) from the local storage media (task 1202), as mentioned above with reference to the process 1100.

In contrast to the methodology used by the process 1100, which utilizes file offset values to facilitate frame-accurate transitions between digital video content found in different files, the process 1200 utilizes PTS values to facilitate the frame-accurate transitions. This PTS-driven methodology allows the STB system to continue reading the primary digital video file ($F_1$) from the HDD as it waits for the transition point. Thus, data for the primary digital video file ($F_1$) will continue to be buffered even though a transition point has been reached. For this example, the process 1200 enables real-time indication and monitoring of decoder PTS values (task 1204). In certain embodiments, task 1204 may be associated with decoder interrupts or scheduled polls whereby the PTS value for the current frame being decoded is provided by the decoder. In this manner, the STB system can be notified of the PTS values in real-time as the respective video frames are being decoded for presentation.

At an appropriate time, the process 1200 will access and open the secondary digital video file ($F_2$) and pre-fetch some of the data into the transport pipeline (task 1206), as described in more detail above for the process 1100. For this particular embodiment, the primary digital video file ($F_1$) is triggered using PTS values, but the secondary digital video file ($F_2$) is cued using its file offset values, as described above for the process 1100. Alternatively, the secondary digital video file ($F_2$) could be cued using its PTS values, however, such a methodology may be less efficient, more cumbersome, and less practical. The task 1206 can be performed before the actual transition is to be displayed to the viewer, and task 1206 may be performed concurrently or in parallel with task 1202 and/or task 1204. Thus, at least some of the desired replacement advertisement content can be pre-fetched and buffered for a quick transition when needed.

The process 1200 monitors the PTS values of the primary digital video file, as obtained from the decoder (query task 1208). This allows the STB system to detect when the current PTS value of the primary digital video file satisfies a predetermined trigger criteria. For example, the process 1200 may detect when the current displayed frame's PTS value is equal to a value that corresponds to the desired transition video frame of the primary digital video file. In this regard, query task 1208 can determine when the current displayed frame's PTS value from the decoder equals the PTS value corresponding to the video frame A (see FIG. 13 and FIG. 15). This condition represents the trigger that causes the STB system to seamlessly transition from the primary digital video file to the secondary digital video file. If the current displayed frame's PTS value equals the predetermined PTS value (labeled PTSA in FIG. 17 because it refers to video frame A), then the process 1200 can proceed by muting the audio/video outputs (task 1210). In addition, the process 1200 resets or flushes the decoder buffer to remove any data associated with the primary digital video file ($F_1$). Recall that the process 1200 need not stop the HDD device driver from reading the primary digital video file ($F_1$) and, therefore, the decoder buffer should be cleared to prepare it for the secondary digital video file. The process 1200 can then proceed as described above beginning at task 1112 of the video content transition process 1100 (FIG. 16). Moreover, a similar approach can be used to execute the frame-accurate transition from the last video frame of the replacement advertisement content (video frame V) to the first video frame in the appropriate segment of the primary digital video file (video frame D), as depicted in FIG. 15.

The techniques and methodologies presented here could also be used to insert secondary digital video content into primary digital video content that is being delivered live to the STB system. In such situations, the secondary digital video content and its CCRs are locally stored at the STB system. Due to the live nature of the primary digital video content, however, the STB system may have little to no opportunity to create CCRs for the primary digital video content ahead of time. In practice, the network will provide overhead signaling information to the STB system in conjunction with the live primary digital video stream, such that the STB system will be aware of opportunities to insert secondary content.

Figure 18:
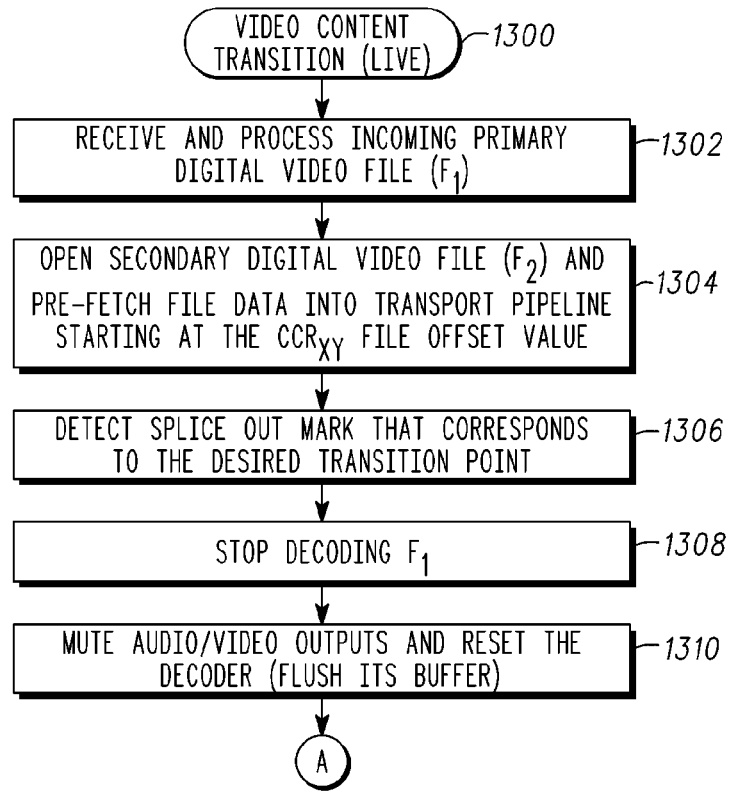
FIG. 18 is a flow chart that illustrates an embodiment of a video content transition process suitable for use with a live video stream.

FIG. 18 is a flow chart that illustrates an embodiment of a video content transition process 1300 suitable for use with a live video stream. The process 1300 can be performed by a component such as an STB system. The process 1300 is executed during live presentation of primary digital video content that is conveyed in a file having splice out marks that indicate certain transition points, e.g., points between program content and network-provided advertisement content. In conjunction with the process 1300, the STB system could also receive (via an overhead signaling channel, for example) data that indicates the presence of an upcoming video segment, such as a network-inserted advertisement, that is susceptible to replacement. This additional background information can be received and processed by the decision engine of the STB system in advance so that the STB system can be prepared to insert locally stored secondary content when needed.

The process 1300 begins by receiving and processing the incoming primary digital video file ($F_1$) in a real-time or live manner (task 1302). This embodiment assumes that the incoming primary digital video file ($F_1$) need not be recorded locally during the process 1300. In connection with task 1302, data associated with the primary digital video file ($F_1$) may be placed into the transport pipeline (e.g., a compressed buffer or a decode buffer) to prepare for decoding. This example assumes that the STB system has prior knowledge that some secondary digital video content (e.g., a replacement advertisement) is to be inserted into the playback stream at a designated point in the primary digital video file, e.g., a point corresponding to a detectable splice out mark contained in the primary digital video file. In practice, the run time or length of the segment of secondary digital video content should be the same as the run time or length of the segment of primary digital video content that is to be replaced. That said, the STB system could employ some normalization, time stretching, time shrinking, blanking, and/or other processing techniques if needed to accommodate time variations.

To prepare for a frame-accurate transition, the process 1300 opens the secondary digital video file ($F_2$) and pre-fetches some of the data into the transport pipeline (task 1304). Notably, the file offset value indicated in the appropriate CCR ($CCR_{XY}$) of the secondary digital video file is utilized as the starting point for the pre-fetching of this data, as described previously. Note that task 1304 may be performed concurrently or in parallel with task 1302. Thus, at least some of the desired replacement advertisement content can be pre-fetched and buffered for a quick transition when needed.

This example assumes that the STB system detects a splice out mark in the incoming primary digital video file (task 1306), where that splice out mark corresponds to the desired transition point for inserted secondary digital video content. As mentioned above, the STB system will have a priori knowledge that this detected splice out mark should be interpreted as a flag or trigger for switching from the primary digital video file to the secondary digital video file. Thus, in response to the detection of this splice out mark, the STB system stops decoding the primary digital video file (task 1308). In addition, the process 1300 could mute the audio/video outputs and reset the decoder (task 1310) as explained previously for the process 1200 (see FIG. 17). Task 1310 is performed to flush the $F_1$ data from the decoder buffer, so that the decoder buffer can accommodate incoming $F_2$ data (for the secondary video file). The process 1300 can then proceed as described above beginning at task 1112 of the video content transition process 1100 (FIG. 16).

Figure 19:
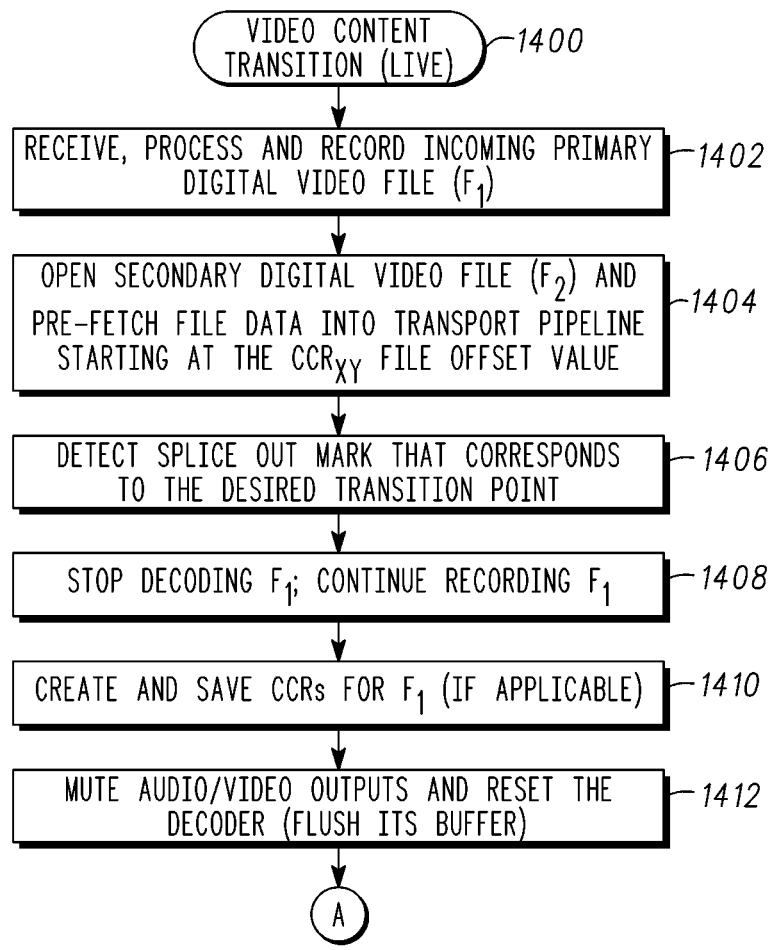
FIG. 19 is a flow chart that illustrates another embodiment of a video content transition process suitable for use with a live video stream.

FIG. 19 is a flow chart that illustrates yet another embodiment of a video content transition process 1400 suitable for use with a live video stream. In contrast to the process 1300, this embodiment contemplates the scenario where the incoming live primary digital video stream is recorded at the STB system. The process 1400 can be performed by a component such as an STB system. The process 1400 is executed during live presentation of primary digital video content that is conveyed in a file having splice out marks that indicate certain transition points, e.g., points between program content and network-provided advertisement content. In conjunction with the process 1400, the STB system could also receive (via an overhead signaling channel, for example) data that indicates the presence of an upcoming video segment, such as a network-inserted advertisement, that is susceptible to replacement. This additional background information can be received and processed by the decision engine of the STB system in advance so that the STB system can be prepared to insert locally stored secondary content when needed.

The process 1400 begins by receiving, processing, and recording the incoming primary digital video file ($F_1$) in a real-time or live manner (task 1402). In connection with task 1402, data associated with the primary digital video file ($F_1$) may be placed into the transport pipeline (e.g., a compressed buffer or a decode buffer) to prepare for decoding. This example assumes that the STB system has prior knowledge that some secondary digital video content (e.g., a replacement advertisement) is to be inserted into the live playback stream at a designated point in the primary digital video file, e.g., a point corresponding to a detectable splice out mark contained in the primary digital video file. Accordingly, the process 1400 accesses and opens the secondary digital video file ($F_2$) and pre-fetches some of the data into the transport pipeline (task 1404). The task 1404 is similar to the task 1304 described above for the process 1300.

This example assumes that the STB system detects a splice out mark in the incoming primary digital video file (task 1406), where that splice out mark corresponds to the desired transition point for inserted secondary digital video content. The task 1406 is similar to the task 1306 described above for the process 1300. Thus, in response to the detection of this splice out mark, the STB system stops decoding the primary digital video file (task 1408). Even though decoding of the primary digital video file ($F_1$) ceases at this point, the STB system may continue recording. Thus, in certain embodiments, the STB system will record the originally received primary digital video file ($F_1$) as-is, including any original advertisements, commercials, etc. Alternatively, the STB system could record the video data that is associated with the content actually presented to the user as a result of the insertion of the secondary digital video content. In other words, the STB system could record a digital video file that includes one or more segments of the primary digital video file ($F_1$) along with one or more replacement segments of the secondary digital video file ($F_2$). It should be appreciated that a STB system could be suitably configured to record at least two versions of the incoming video data: (1) the original primary digital video file as-is; and (2) a version of the primary digital video file having one or more segments that have been replaced or supplemented with locally stored secondary digital video content.

The process 1400 may also create and save CCRs for the primary digital video file if applicable and if desired (task 1410). In other words, the process 1400 may include or cooperate with the tasks described above for the process 300 (see FIG. 3). In practice, task 1410 could be performed at any time after the STB system has obtained the primary digital video file ($F_1$), and the CCRs for $F_1$ need not be generated immediately to support the insertion of secondary digital video content "on-the-fly" as described here. In certain implementations, a CCR for $F_1$ could be generated such that it contains an indicator or pointer that indentifies the secondary video content corresponding to that splice out mark. In this regard, the CCR for $F_1$ might indicate a corresponding CCR for $F_2$, a respective file offset value, a respective PTS value, etc. This will allow the STB system to record the original $F_1$ content as-is, while still enabling subsequent playback of the inserted secondary video content.

In connection with the "stop decoding" command (task 1408), the process 1400 could mute the audio/video outputs and reset the decoder (task 1412) as explained previously for the process 1200 (see FIG. 17). Task 1412 is performed to flush any $F_1$ data from the decoder buffer, so that the decoder buffer can accommodate incoming $F_2$ data (for the secondary video file). The process 1400 can then proceed as described above beginning at task 1112 of the video content transition process 1100 (FIG. 16).

Again, it should be appreciated that the methodologies described above with reference to FIGS. 13-19 could be employed to insert secondary video content into primary video content, and the secondary video content might replace and/or supplement the primary video content. Indeed, these techniques and methodologies can be utilized to process primary and secondary video content in an appropriate manner, resulting in the type of arrangements depicted in FIGS. 7-12, without limitation. Moreover, although several simplified examples that process two digital video files ($F_1$ and $F_2$) have been presented, the techniques and methodologies described herein can of course accommodate any number of digital video files, and a primary digital video file could be modified such that, when displayed, it contains video content from any number of different and distinct locally stored files. Furthermore, the techniques and methodologies described herein could be applied to a digital video file that has already been subjected to content replacement and/or insertion (one or more times). For instance, an STB system could locally store a modified version of an original digital video file, where that modified version includes some original video content and one or more segments of inserted secondary video content. This modified digital video file could subsequently be processed and manipulated in the manner described above to insert additional tertiary video content, replace some of the original video content with a segment of tertiary video content, replace some of the secondary video content with a segment of tertiary video content, or the like.

The above description focuses on the processing of digital video data, video frames, and video content. Such video content will typically have synchronized audio data associated therewith. In practice, such audio content will be processed in cooperation with the video content to maintain synchronization and alignment between segments of primary and secondary digital video content. The STB system could leverage the same techniques and methodologies described above (e.g., using splice out marks, CCRs, file offset values, etc.) for use with digital audio data, or it could transition the digital audio data along with its corresponding digital video data.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a digital video service set top box system having digital video recorder functionality, the method comprising:
   receiving an insertion content file that includes secondary video content;
   creating insertion content change records (CCRs) associated with the insertion content file based on detected splice marks in the insertion content file, the insertion CCRs each comprising at least one indicator value selected from a group consisting of a file offset value and a presentation time stamp (PTS) value, wherein a first indicator value of a first CCR enables frame-accurate location of an initial video frame of the secondary video content and a second indicator value of a second CCR enables frame-accurate location of a last video frame of the secondary video content;
   storing the insertion CCRs associated with the insertion content file;
   initiating playback of a primary content file that includes at least a first video segment and a second video segment;
   during playback of the primary content file, determining a transition between the first video segment and the second video segment;
   in response to the determining step, using the first indicator value of the first CCR to locate the initial video frame of the secondary video content, and transitioning from an ending video frame of the first video segment to the initial video frame of the secondary video content indicated in the first CCR; and
   initiating playback of the insertion content file, starting with the initial video frame of the secondary video content,
   wherein the secondary video content replaces the second video segment of the primary content file, and wherein the duration of the secondary video content is different than the duration of the second video segment of the primary content file.

2. The method of claim 1, wherein the secondary video content is inserted between the first video segment and the second video segment.

3. The method of claim 1, further comprising:
   during playback of the insertion content file, monitoring file offset values of the insertion content file;
   detecting when a current file offset value of the insertion content file satisfies predetermined trigger criteria corresponding to the second indicator value; and
   in response to the detecting step, transitioning from the last video frame of the secondary video content to a starting video frame of another video segment of the primary content file.

4. The method of claim 1, further comprising:
   during playback of the insertion content file, monitoring presentation time stamp values of the insertion content file;
   detecting when the current presentation time stamp value of the insertion content file satisfies predetermined trigger criteria corresponding to the second indicator value; and in response to the detecting step, transitioning from the last video frame of the secondary video content to a starting video frame of another video segment of the primary content file.

5. The method of claim 3, further comprising:
receiving the primary content file;
creating a primary CCR associated with the primary content file, the primary CCR comprising a primary indicator value selected from a group consisting of a file offset value and a presentation time stamp (PTS) value, wherein the primary indicator value enables frame-accurate location of the transition between the first video segment of the primary content file and the second video segment of the primary content file; and
storing the primary CCR associated with the primary content file,
wherein transitioning from the last video frame of the secondary video content to the starting video frame of another video segment of the primary content file comprises using the primary indicator value to locate an initial video frame of the second video segment of the primary content file.

6. A system comprising:
one or more computers; and
one or more storage devices storing instructions that are operable, when executed by the one or more computers, to cause the one or more computers to perform operations for operating a digital video service set top box system having digital video recorder functionality, the operations comprising:
receiving an insertion content file that includes secondary video content;
creating insertion content change records (CCRs) associated with the insertion content file based on detected splice marks in the insertion content file, the insertion CCRs each comprising at least one indicator value selected from a group consisting of a file offset value and a presentation time stamp (PTS) value, wherein a first indicator value of a first CCR enables frame-accurate location of an initial video frame of the secondary video content and a second indicator value of a second CCR enables frame-accurate location of a last video frame of the secondary video content;
storing the insertion CCRs associated with the insertion content file;
initiating playback of a primary content file that includes at least a first video segment and a second video segment;
during playback of the primary content file, determining a transition between the first video segment and the second video segment;
in response to the determining step, using the first indicator value of the first CCR to locate the initial video frame of the secondary video content, and transitioning from an ending video frame of the first video segment to the initial video frame of the secondary video content indicated in the first CCR; and
initiating playback of the insertion content file, starting with the initial video frame of the secondary video content,
wherein the secondary video content replaces the second video segment of the primary content file, and wherein the duration of the secondary video content is different than the duration of the second video segment of the primary content file.

7. The system of claim 6, wherein the secondary video content is inserted between the first video segment and the second video segment.

8. The system of claim 6, the operations further comprising:
during playback of the insertion content file, monitoring file offset values of the insertion content file;
detecting when a current file offset value of the insertion content file satisfies predetermined trigger criteria corresponding to the second indicator value; and
in response to the detecting step, transitioning from the last video frame of the secondary video content to a starting video frame of another video segment of the primary content file.

9. The system of claim 6, the operations further comprising:
during playback of the insertion content file, monitoring presentation time stamp values of the insertion content file;
detecting when the current presentation time stamp value of the insertion content file satisfies predetermined trigger criteria corresponding to the second indicator value; and
in response to the detecting step, transitioning from the last video frame of the secondary video content to a starting video frame of another video segment of the primary content file.

10. The system of claim 8, the operations further comprising:
receiving the primary content file;
creating a primary CCR associated with the primary content file, the primary CCR comprising a primary indicator value selected from a group consisting of a file offset value and a presentation time stamp (PTS) value, wherein the primary indicator value enables frame-accurate location of the transition between the first video segment of the primary content file and the second video segment of the primary content file; and
storing the primary CCR associated with the primary content file,
wherein transitioning from the last video frame of the secondary video content to the starting video frame of another video segment of the primary content file comprises using the primary indicator value to locate an initial video frame of the second video segment of the primary content file.

11. A non-transitory computer-readable medium storing software comprising instructions executable by one or more computers which, upon such execution, cause the one or more computers to perform operations for operating a digital video service set top box system having digital video recorder functionality, the operations comprising:
receiving an insertion content file that includes secondary video content;
creating insertion content change records (CCRs) associated with the insertion content file based on detected splice marks in the insertion content file, the insertion CCRs each comprising at least one indicator value selected from a group consisting of a file offset value and a presentation time stamp (PTS) value, wherein a first indicator value of a first CCR enables frame-accurate location of an initial video frame of the secondary video content and a second indicator value of a second CCR enables frame-accurate location of a last video frame of the secondary video content;
storing the insertion CCRs associated with the insertion content file;

initiating playback of a primary content file that includes at least a first video segment and a second video segment;

during playback of the primary content file, determining a transition between the first video segment and the second video segment;

in response to the determining step, using the first indicator value of the first CCR to locate the initial video frame of the secondary video content, and transitioning from an ending video frame of the first video segment to the initial video frame of the secondary video content indicated in the first CCR; and initiating playback of the insertion content file, starting with the initial video frame of the secondary video content, wherein the secondary video content replaces the second video segment of the primary content file, and wherein the duration of the secondary video content is different than the duration of the second video segment of the primary content file.

12. The medium of claim 11, wherein the secondary video content is inserted between the first video segment and the second video segment.

13. The medium of claim 11, the operations further comprising:

during playback of the insertion content file, monitoring file offset values of the insertion content file;

detecting when a current file offset value of the insertion content file satisfies predetermined trigger criteria corresponding to the second indicator value; and in response to the detecting step, transitioning from the last video frame of the secondary video content to a starting video frame of another video segment of the primary content file.

14. The medium of claim 11, the operations further comprising:

during playback of the insertion content file, monitoring presentation time stamp values of the insertion content file;

detecting when the current presentation time stamp value of the insertion content file satisfies predetermined trigger criteria corresponding to the second indicator value; and in response to the detecting step, transitioning from the last video frame of the secondary video content to a starting video frame of another video segment of the primary content file.

15. The medium of claim 13, the operations further comprising:

receiving the primary content file;

creating a primary CCR associated with the primary content file, the primary CCR comprising a primary indicator value selected from a group consisting of a file offset value and a presentation time stamp (PTS) value, wherein the primary indicator value enables frame-accurate location of the transition between the first video segment of the primary content file and the second video segment of the primary content file; and storing the primary CCR associated with the primary content file, wherein transitioning from the last video frame of the secondary video content to the starting video frame of another video segment of the primary content file comprises using the primary indicator value to locate an initial video frame of the second video segment of the primary content file.

* * * * *